United States Patent Office.

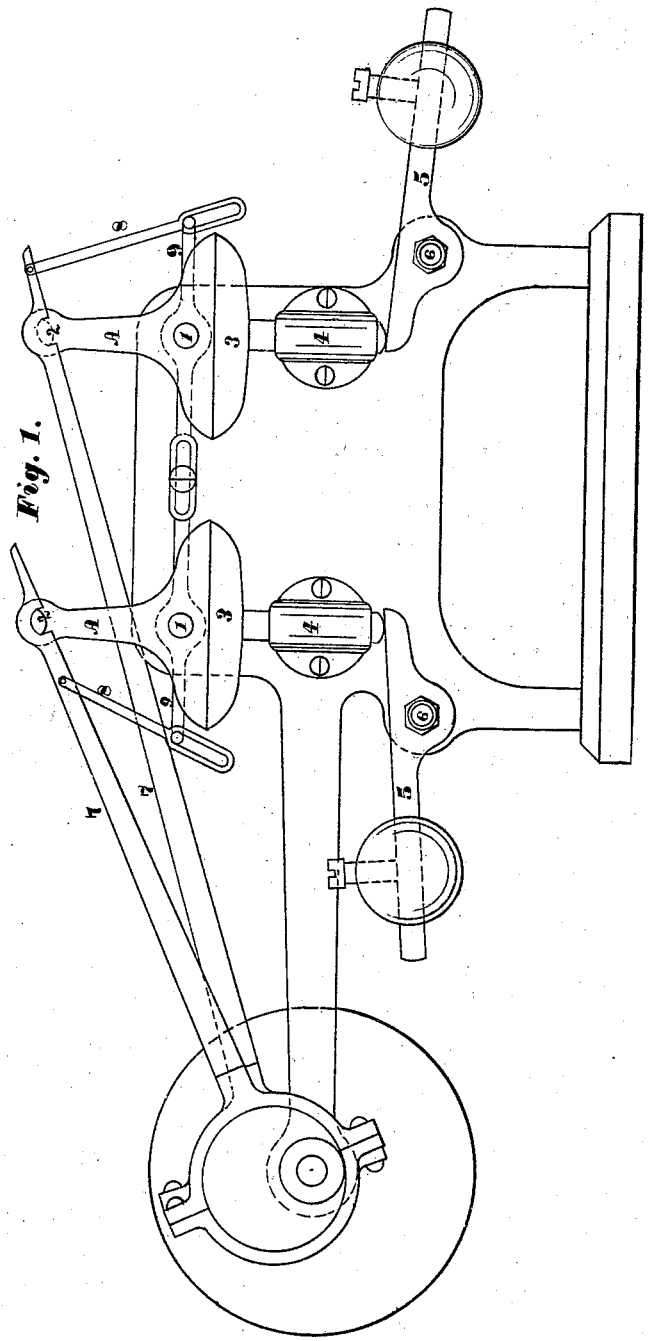

SETH H. WHITMORE, OF DECATUR, ILLINOIS.

Letters Patent No. 113,232, dated March 28, 1871.

IMPROVEMENT IN CUT-OFF VALVE-GEARS.

The Schedule referred to in these Letters Patent and making part of the same

I, SETH H. WHITMORE, of Decatur, in the county of Macon and State of Illinois, have invented certain Improvements in Valve-motion for Cut-off Steam-Engines, of which the following is a specification.

Nature and Objects of the Invention.

My improvement relates more particularly to the apparatus for admitting and shutting off the supply of steam to a steam-engine, and for controlling or governing such supply, and consists of a cut-off simple in its construction and effective in its operation, which is brought directly under the control of the governing power, so that the admission of steam shall correspond to and be regulated by the slightest variation of the speed of the engine.

Description of the Accompanying Drawing.

Figure 1 is a side elevation of a machine embodying my invention.

General Description.

1 1 represent the valve-stems, to which are fastened the inverted arms and stop motions A A.

2 2 are the catches by which the valves are opened to admit the steam to the cylinder, and to open the exhaust.

3 3 are arms working through the guides 4 4, and on the short ends of the levers 5 5, the levers working on the studs 6 6.

Upon the long end of the levers are fastened adjustable weights, so the levers can be made to give more or less power, to correspond to the pressure of steam that the valve may be working under, and at the same time, after the hooks 7 7 have been lifted off of the catches, to close the valve and shut off the supply of steam to the cylinder, holding the valve over the steam opening and preventing the steam from going in or out of the cylinder, and preventing the valves from passing too far in their closing motion, so that the valves shall always stop at the right place, serving the double purpose of a closing and stop-motion to the valves.

7 7 are the eccentrics and hooks by which the valves are opened, they receiving their motion from the main shaft; at the same time the eccentrics have a rotary motion the hooks have a forward and backward motion.

8 8 are lifters fastened to the hooks 7 7, with slotted ends working on the pins on the short ends of the levers 9 9, which work upon the valve-stems 1 1, the levers 9 9 having an up-and-down motion.

The long ends of the levers 9 9 have a slot in them, with a bolt or stud to hold them; they can be moved up and down by hand, or have a governor, and be so regulated as to admit the amount of steam wanted in the cylinder to do the work.

The hooks, in their forward-and-backward motion, take hold of the catches, and thus open and close the valves at the right time.

When one eccentric and hook is opening the valve at one end of the cylinder to admit the steam into the cylinder, the other eccentric and hook open the exhaust at the other end of the cylinder.

When the hook is doing the exhausting it will not let go of the catch, and only lets go when the valve is letting steam into the cylinder.

The cut-off above described may be adjusted by hand, by means of a screw or lever applied to the bolt in the centers of the levers 9 9, by means of which the levers, with their pins, may be raised or lowered; or the cut-off may be brought directly under the control of the governing-power of the governor by operating through the bolt in the long ends of the levers 9 9, the governor in turn being operated by means of the ordinary gearing.

When the cut-off and governor are thus combined, their joint operation will be as follows, viz: as the engine increases its speed the governor-balls will raise and throw down the long arms of levers 9 9, which throws the short arms of the levers up, and with them their pins, so that the lifters 8 8 will strike the upper ends of the slots and lift the hooks 7 7 from off the catches 2 2 before the engine has made full stroke.

As soon as the hooks are thus disengaged from the catches the valves close instantly and cut off the supply of steam; this may occur at any part in the stroke, and corresponds exactly to the wants of an engine and to its varying rate of speed.

On the other hand, as the speed of the engine decreases, the balls will descend and draw up the long ends of the levers, throwing the short ends of the levers down, and with them their pins, so that the lifters do not strike the pins and lift the hooks from the catches, and permit the valves to close until the engine has made nearly or quite a full stroke.

Claims.

I claim as my invention—

1. The combination of the vibrating arms A A, catches 2 2, and the sliding arms 3 3, working on the ends of the levers 5 5, with the adjustable weights, and the eccentrics and hooks for operating the same, substantially as and for the purpose hereinbefore set forth.

2. The two T-shaped arms working with their faces one upon the other, and the adjustable weight which, by its own weight, shall close the valve or valves of a steam-engine by transmitting its power to the valves, by means of the lever and the two T-shaped arms, substantially as described.

Witnesses:            SETH H. WHITMORE.
  CHARLES P. HOUSUM,
  WILLIAM GABLER.